(12) United States Patent
Asaoka et al.

(10) Patent No.: US 12,134,279 B2
(45) Date of Patent: Nov. 5, 2024

(54) LASER MARKING APPARATUS, LASER MARKING SYSTEM, AND LASER MARKING METHOD

(71) Applicant: SINTOKOGIO, LTD., Nagoya (JP)

(72) Inventors: Yasuaki Asaoka, Nagoya (JP);
Kazunori Ogura, Nagoya (JP);
Toshiyuki Ishikawa, Nagoya (JP);
Takehiro Sugino, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 602 days.

(21) Appl. No.: 17/213,312

(22) Filed: Mar. 26, 2021

(65) Prior Publication Data

US 2021/0309036 A1 Oct. 7, 2021

(30) Foreign Application Priority Data

Apr. 3, 2020 (JP) .................. 2020-067753

(51) Int. Cl.
| | | |
|---|---|---|
| *B23K 26/16* | (2006.01) | |
| *B23K 26/12* | (2014.01) | |
| *B23K 26/359* | (2014.01) | |
| *B41M 5/24* | (2006.01) | |

(52) U.S. Cl.
CPC ............. *B41M 5/24* (2013.01); *B23K 26/127* (2013.01); *B23K 26/16* (2013.01); *B23K 26/359* (2015.10)

(58) Field of Classification Search
CPC .... B23K 26/00; B23K 2101/18; B23K 26/02; B23K 26/06; B23K 26/0648; B23K 26/08; B23K 26/10; B23K 26/12; B23K 26/123; B23K 26/128; B23K 26/14; B23K 26/1436; B23K 26/1476; B23K 26/362; B23K 26/38; B23K 26/706; B23K 37/0235; B23K 37/0408
USPC ...................................... 219/121.86
See application file for complete search history.

(56) References Cited

U.S. PATENT DOCUMENTS

| | | | |
|---|---|---|---|
| 5,329,985 A | | 7/1994 | Weimann |
| 2020/0246913 A1* | | 8/2020 | Sartin .................. B23K 26/142 |

FOREIGN PATENT DOCUMENTS

| | | |
|---|---|---|
| CN | 110167689 A | 8/2019 |
| JP | S56-009101 U | 1/1981 |
| JP | S59-167507 U | 11/1984 |
| JP | H04-156601 A | 5/1992 |
| JP | H08-238586 A | 9/1996 |
| JP | H08-309575 A | 11/1996 |
| JP | 2000-015395 A | 1/2000 |
| JP | 2001-136859 A | 5/2001 |

(Continued)

OTHER PUBLICATIONS

English translation of JP2002035984A (Year: 2002).*

*Primary Examiner* — Chris Q Liu
(74) *Attorney, Agent, or Firm* — Faegre Drinker Biddle & Reath LLP

(57) ABSTRACT

A laser marking apparatus includes a head marking the identifier on a mold, a light-shielding case, a light-shielding gate provided at either a carrying-in port or a carrying-out port of the light-shielding case, and a control unit controlling operation of the head and operation of the light-shielding gate, and the control unit closes the light-shielding gate and causes the head to start a marking operation on the mold in response to carrying-in of the mold into the operation space and opens the light-shielding gate in response to the marking operation ending.

8 Claims, 10 Drawing Sheets

(56) References Cited

FOREIGN PATENT DOCUMENTS

| | | |
|---|---|---|
| JP | 2002-035984 A | 2/2002 |
| JP | 2003-145284 A | 5/2003 |
| JP | 2006-007293 A | 1/2006 |
| JP | 2006-263804 A | 10/2006 |
| JP | 2009-241149 A | 10/2009 |
| JP | 2010-214437 A | 9/2010 |
| JP | 2015-110243 A | 6/2015 |
| JP | 2016-175124 A | 10/2016 |

* cited by examiner

LASER MARKING APPARATUS, LASER MARKING SYSTEM, AND LASER MARKING METHOD

CROSS-REFERENCE TO RELATED APPLICATION

This application is based on Japanese Patent Application No. 2020-067753 filed with Japan Patent Office on Apr. 3, 2020, the entire contents of which are hereby incorporated by reference.

TECHNICAL FIELD

The present disclosure relates to a laser marking apparatus, a laser marking system, and a laser marking method.

BACKGROUND

Japanese Unexamined Patent Publication No. 2000-15395 discloses a casting facility including a laser marking apparatus that engraves an identifier, such as a character or a number, on a mold and a conveyance apparatus that conveys the mold from a molding machine.

SUMMARY

In the casting facility described in Japanese Unexamined Patent Publication No. 2000-15395, it can be considered that the laser marking apparatus is provided in the conveyance apparatus and marks the identifier on the mold being conveyed. In this case, it can be considered that an operation space of the laser marking apparatus is covered with a light-shielding member taking into consideration the influence of laser light on the surrounding environments. However, it is difficult to completely cover the operation space of the laser marking apparatus with the light-shielding member because carrying-in and carrying-out ports for the mold into the operation space of the laser marking apparatus are required. The present disclosure provides a technique capable of suppressing leakage of laser light from the operation space to the outside in marking an identifier on a mold on a conveyance line using laser light.

A laser marking apparatus according to one aspect of the present disclosure is provided on a conveyance line conveying a mold and marks an identifier on the mold on the conveyance line. The laser marking apparatus includes a head marking the identifier on the mold by applying laser light to the mold; a light-shielding case defining, inside the light-shielding case, an operation space housing the head, the light-shielding case including a carrying-in port communicating with the operation space and a carrying-out port communicating with the operation space, the light-shielding case being provided on the conveyance line in such a manner that the mold is carried into and carried out of the operation space through the carrying-in port and the carrying-out port; a light-shielding gate provided at either the carrying-in port or the carrying-out port and openable and closable; and a control unit controlling operation of the head and operation of the light-shielding gate. The control unit closes the light-shielding gate and causes the head to start a marking operation on the mold in response to carrying-in of the mold into the operation space and opens the light-shielding gate in response to the marking operation ending.

In the laser marking apparatus, the mold is carried into the carrying-in port of the light-shielding case through the conveyance line. When the mold is carried into the operation space inside the light-shielding case, the light-shielding gate provided at either the carrying-in port or the carrying-out port is closed, and the marking operation on the mold is started. When the marking operation is finished, the light-shielding gate is opened. In this manner, the light-shielding gate is opened when the mold is conveyed, and the light-shielding gate is closed when the laser light is applied to the mold. This enables the laser marking apparatus to suppress leakage of the laser light from the operation space to the outside when the identifier is marked on the mold on the conveyance line by using the laser light.

In one embodiment, the light-shielding gate may be provided at the carrying-in port, the laser marking apparatus may further include an additional light-shielding gate provided at the carrying-out port, and the control unit may close the light-shielding gate and the additional light-shielding gate and cause the head to start a marking operation on the mold in response to carrying-in of the mold into the operation space and open the light-shielding gate and the additional light-shielding gate in response to the marking operation ending. In this case, the light-shielding gate is provided at each of the carrying-in port and the carrying-out port. Thus, the laser marking apparatus can more reliably suppress leakage of the laser light from the operation space to the outside than a case where the light-shielding gate is provided only at either the carrying-in port or the carrying-out port.

In one embodiment, the carrying-in port and the carrying-out port may be configured as an opening, and the light-shielding gate may be provided at the opening.

In one embodiment, the control unit may be configured to be communicable with a line controller controlling operation of the conveyance line, the line controller may transmit a carrying-in completion signal to the control unit when the mold has been carried into the operation space, and the control unit may close the light-shielding gate after receiving the carrying-in completion signal from the line controller. In this case, the laser marking apparatus can avoid interference between the mold on the conveyance line and the light-shielding gate.

In one embodiment, the control unit may include a head controller and a gate controller, the head controller may transmit a marking completion signal to the gate controller when the marking operation is completed, and the gate controller may open the light-shielding gate after receiving the marking completion signal. In this case, the laser marking apparatus can open the light-shielding gate after the marking operation of the head is completed.

In one embodiment, the control unit may include a head controller and a gate controller, the head controller may transmit an abnormal signal to the gate controller when the head does not normally operate, and the gate controller may open the light-shielding gate when receiving the abnormal signal. In this case, the laser marking apparatus can avoid the influence of a fault of the head on the conveyance of the mold.

In one embodiment, the control unit may include a head controller and a gate controller, the line controller may transmit a passage signal to the control unit when receiving a signal indicating carrying-in of a mold that does not need to be marked with the identifier, the head controller may not cause the head to start a marking operation on the mold that does not need to be marked with the identifier when receiving the passage signal, and the gate controller may open the light-shielding gate when receiving the passage signal. In this case, the laser marking apparatus can omit the marking operation on the mold that does not need to be marked with the identifier and can thus prevent shortening of the life of a light source which generates the laser light and the life of the head.

In one embodiment, the laser marking apparatus may further include a dust collector provided on the light-shielding case. In this case, the laser marking apparatus can suppress attenuation of the laser light caused by, for example, smoke generated in the marking operation and suppress reduction in the accuracy of marking.

In one embodiment, the laser marking apparatus may further include a light source generating laser light, a cable transmitting laser light from the light source to the head, a cover member covering the cable, and a support member supporting the cable and the cover member. In this case, since bending stress generated on the cable is reduced by the cover member and the support member, the laser marking apparatus can reduce deterioration of the cable as compared to a case where the cover member and the support member are not provided.

A laser marking system according to another aspect of the present disclosure includes a conveyance line conveying a mold, a head marking an identifier on the mold on the conveyance line by applying laser light to the mold; a light-shielding case defining, inside the light-shielding case, an operation space housing the head, the light-shielding case including a carrying-in port communicating with the operation space and a carrying-out port communicating with the operation space, the light-shielding case being provided on the conveyance line in such a manner that the mold is carried into and carried out of the operation space through the carrying-in port and the carrying-out port; a light-shielding gate provided at either the carrying-in port or the carrying-out port and openable and closable; and a control unit controlling operation of the head and operation of the light-shielding gate. The control unit closes the light-shielding gate and causes the head to start a marking operation on the mold in response to carrying-in of the mold into the operation space and opens the light-shielding gate in response to the marking operation ending.

In the laser marking system, the mold is carried into the carrying-in port of the light-shielding case through the conveyance line. When the mold is carried into the operation space inside the light-shielding case, the light-shielding gate provided at either the carrying-in port or the carrying-out port is closed, and the marking operation on the mold is started. When the marking operation is finished, the light-shielding gate is opened. In this manner, the light-shielding gate is opened when the mold is conveyed, and the light-shielding gate is closed when the laser light is applied to the mold. This enables the laser marking system to suppress leakage of the laser light from the operation space to the outside when the identifier is marked on the mold on the conveyance line by using the laser light.

A laser marking method according to another aspect of the present disclosure is a laser marking method for marking an identifier on a mold on a conveyance line conveying the mold, the method including carrying the mold into an operation space for marking the identifier, the operation space being defined inside a light-shielding case including a carrying-in port communicating with the operation space and a carrying-out port communicating with the operation space, closing a light-shielding gate, the light shielding gate being provided at either the carrying-in port or the carrying-out port and openable and closable, in response to carrying-in of the mold into the operation space, starting a marking operation on the mold in response to closing of the light-shielding gate, and opening the light-shielding gate in response to the marking operation ending.

In the laser marking method, the mold is conveyed to the carrying-in port of the light-shielding case. The light-shielding gate is closed in response to carrying-in of the mold into the operation space. The marking operation on the mold is started in response to closing of the light-shielding gate. The light-shielding gate is opened in response to the marking operation on the mold ending. In this manner, the light-shielding gate is opened when the mold is conveyed, and the light-shielding gate is closed when the laser light is applied to the mold. This enables the laser marking method to suppress leakage of the laser light from the operation space to the outside when the identifier is marked on the mold on the conveyance line by using the laser light.

According to the present disclosure, it is possible to suppress leakage of laser light from an operation space to the outside in marking an identifier on a mold on a conveyance line by a laser marking apparatus.

DETAILED DESCRIPTION

Figure 1:
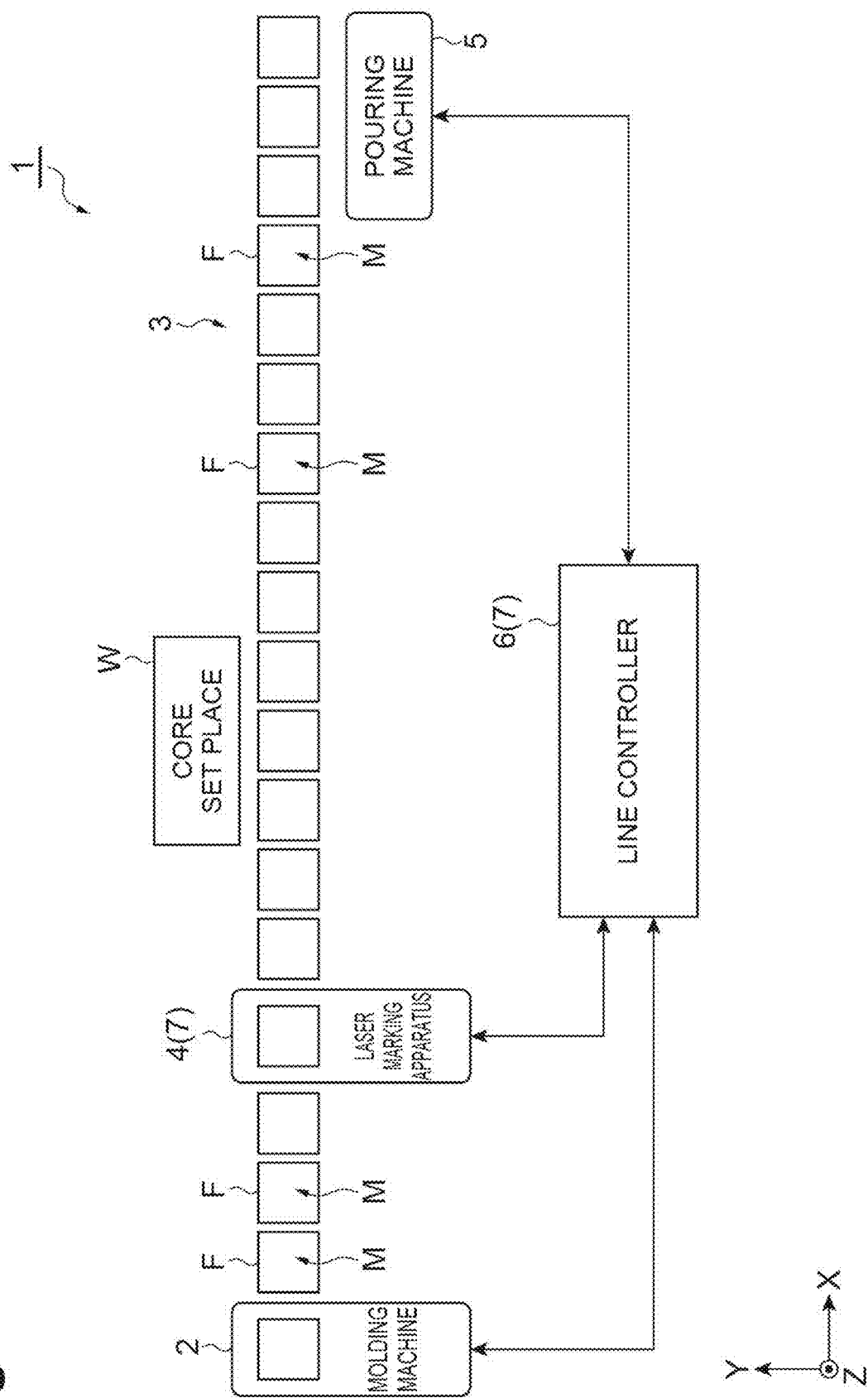
FIG. 1 a configuration diagram schematically illustrating an example of a casting system including a laser marking apparatus according to an embodiment.

Hereinbelow, an embodiment of the present disclosure will be described with reference to the drawings. Note that, in the following description, identical reference signs designate identical or corresponding elements to omit redundant description. The dimensional ratio in the drawings does not necessarily coincide with an actual ratio. The "up", "down", "left" and "right" are based on an illustrated state and used for convenience sake. The X direction and the Y direction in the drawings indicate the horizontal direction, and the Z direction in the drawings indicates the vertical direction.

Example of Casting System

FIG. 1 is a configuration diagram schematically illustrating an example of a casting system including a laser marking apparatus according to an embodiment. A casting system 1 illustrated in FIG. 1 is a system for manufacturing casts. The casting system 1 includes a molding machine 2, a conveyance line 3, a laser marking apparatus 4, a pouring machine 5, and a line controller 6.

The molding machine 2 is a machine which manufactures a mold M. The molding machine 2 forms the mold M using a molding flask F. The molding machine 2 is communicably connected to the line controller 6. When receiving a molding start signal from the line controller 6, the molding machine 2 starts manufacturing the mold M in a molding area. The molding machine 2 charges sand (green sand) into the molding flask F in which a pattern is set and compacts the sand inside the molding flask F by applying pressure to the sand. The molding machine 2 forms the mold M by taking the pattern out of the compacted sand. The molding machine 2 transmits a molding result signal to the line controller 6. The molding result signal is a signal indicating whether the molding machine 2 has normally operated.

The conveyance line 3 is a facility which conveys molds. The conveyance line 3 receives the mold M from the molding machine 2 and conveys the mold M to the pouring machine 5. The conveyance line 3 includes, for example, a roller conveyor, a rail, a carriage which travels on the rail with the mold M and the molding flask F placed thereon, a pusher device which is disposed at the molding machine 2 side, and a cushion device which is disposed at the pouring machine 5 side. The roller conveyor or the rail linearly extends from the molding machine 2 to the pouring machine 5. The roller conveyor or the rail may extend not linearly, but, for example, in a step-like manner. The roller conveyor or the rail may extend in a single stroke manner between the molding machine 2 and the pouring machine 5. The conveyance line 3 sequentially conveys a plurality of molds M and molding flasks F, which are arrayed at regular intervals on the roller conveyor or the rail, from the molding machine 2 to the pouring machine 5. The conveyance line 3 is intermittently driven and conveys the molds M and molding flasks F by a predetermined number of flasks at each drive. The predetermined number of flasks may be one flask or may be a plurality of flasks. The conveyance line 3 is communicably connected to the line controller 6. When receiving a flask feeding signal from the line controller 6, the conveyance line 3 conveys the plurality of molds M and molding flasks F by the predetermined number of flasks. Upon completion of the conveyance of the predetermined number of flasks, the conveyance line 3 transmits a flask feeding completion signal to the line controller 6. The conveyance line 3 may transmit the flask feeding completion signal to the line controller 6 when positioning of the conveyed molds M and molding flasks F is completed.

The laser marking apparatus 4 is provided on the conveyance line 3 and marks an identifier on the mold M on the conveyance line 3 by applying laser light to the mold M. The laser marking apparatus 4 is communicably connectable to the line controller 6. The laser marking apparatus 4, the conveyance line 3, and the line controller 6 constitute a laser marking system 7 when operating in cooperation with each other. Details of the laser marking apparatus 4 will be described later.

The pouring machine 5 is a machine which pours molten metal into the mold M. The pouring machine 5 is communicably connected to the line controller 6. When receiving the flask feeding completion signal from the line controller 6, the pouring machine 5 pours molten metal into a mold M located in a pouring area as a pouring target. The pouring machine 5 receives mold information from the line controller 6 and pours molten metal under a condition based on the mold information. The mold M with molten metal is conveyed to an area where a downstream process is performed through the conveyance line 3.

A core set place W may be provided between the molding machine 2 and the pouring machine 5. An operator stays in the core set place W and sets a core in the mold M. Alternatively, an apparatus may automatically set the core in the mold M.

The line controller 6 is a controller which performs centralized control of the casting system 1. The line controller 6 is configured as, for example, a programmable logic controller (PLC). The line controller 6 may be configured as a computer system including a processor, such as a central processing unit (CPU), a memory, such as a random access memory (RAM) and a read only memory (ROM), an input/output device, such as a touch panel, a mouse, a keyboard, or a display, and a communication device, such as a network card. The line controller 6 implements the function of the line controller 6 by operating each hardware under control of the processor based on a computer program stored in the memory.

Details of Laser Marking Apparatus

Figure 2:
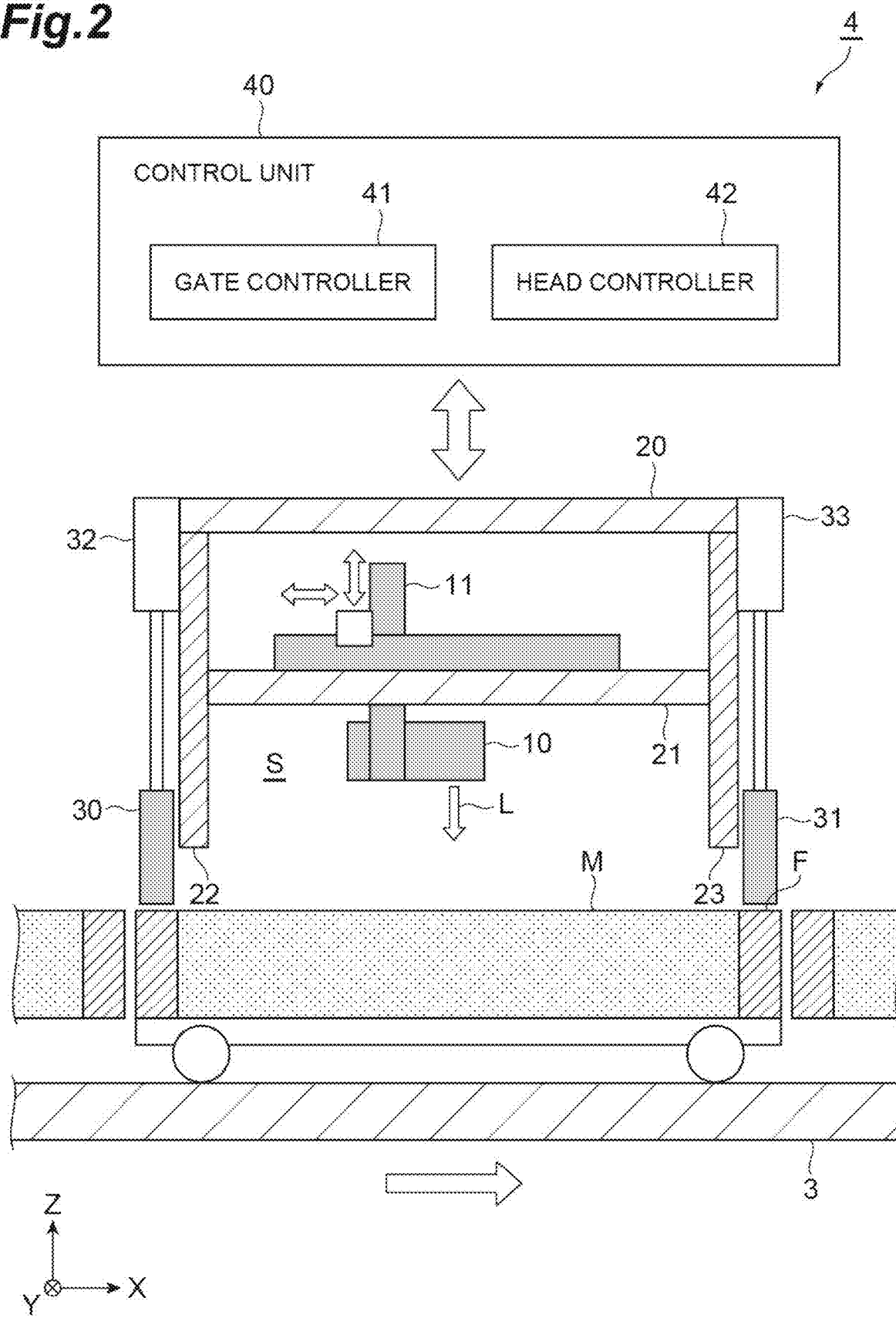
FIG. 2 is a sectional view illustrating an example of the configuration of the laser marking apparatus.

FIG. 2 is a sectional view illustrating an example of the configuration of the laser marking apparatus. As illustrated in FIG. 2, the laser marking apparatus 4 includes a head 10, a light-shielding case 20, a light-shielding gate 30, a light-shielding gate 31, and a control unit 40.

The head 10 marks an identifier on the mold M by applying laser light L to the mold M. The identifier is a character, a number, or a symbol imparted to an object, and to mark means to place the character, the number, or the symbol on the mold. Hereinbelow, a case where the mold M is engraved will be described as an example.

The head 10 is a component which focuses the laser light L at any position. The head 10 is connected to a light source 12 (refer to FIG. 9) which generates laser light. For example, the head 10 includes a galvanometer mirror (not illustrated) and a focusing lens (not illustrated) and adjusts an irradiation position and a focal position of the laser light L. The head 10 focuses the focal position of the laser light L at any position on the surface of the mold M to mark the identifier.

The head 10 is housed in an operation space S which is defined inside the light-shielding case 20. The head 10 is supported by a frame member 21 which is disposed in the operation space S. The head 10 is movable in three directions: the X, Y, and Z directions through a three-axis driving mechanism 11. Thus, the head 10 is positioned in the operation space S by the three-axis driving mechanism 11 and capable of, at the position, adjusting the irradiation position and the focal position of the laser light L and marking the identifier.

The light-shielding case 20 includes a carrying-in port 22 and a carrying-out port 23 which communicate with the operation space S. The light-shielding case 20 is provided on the conveyance line 3 in such a manner that the mold M is carried into and carried out of the operation space S through the carrying-in port 22 and the carrying-out port 23. For example, in a case where the conveyance line 3 is straight, the carrying-in port 22 and the carrying-out port 23 are formed on the light-shielding case 20 in such a manner as to be opposed to each other. The light-shielding case 20 is provided on the conveyance line 3 in such a manner that the opposed direction of the carrying-in port 22 and the carrying-out port 23 coincides with the extending direction of the conveyance line 3. The light-shielding case 20 has light shielding property against the laser light L applied thereto by the head 10. The light-shielding case 20 is formed of, for example, a metal material or a resin material. Examples of the metal include iron, aluminum, stainless steel, a copper alloy, or carbon steel.

The light-shielding gate 30, which is openable and closable, is provided at either the carrying-in port 22 or the carrying-out port 23. In the example of FIG. 2, the light-shielding gate 30 is provided at the carrying-in port 22, and a light-shielding gate 31 different from the light-shielding gate 30 is provided at the carrying-out port 23. The light-shielding gate 30 (31) has light-shielding property against the laser light L applied thereto by the head 10. The light-shielding gate 30 (31) is formed of, for example, a metal material or a resin material. The light-shielding gate 30 (31) may be formed of the same material as the light-shielding case 20.

Opening/closing of the light-shielding gate 30 (31) means that the light-shielding gate 30 (31) moves to either an open position or a closed position. The light-shielding gate 30 (31) is connected to a driving unit 32 (33). The driving unit 32 (33) is, for example, a motor-operated cylinder, an air cylinder, a hydraulic cylinder, a wire hoisting device, or a rack-and-pinion mechanism. The light-shielding gate 30 (31) moves in the Z direction through the operation of the driving unit 32(33). Accordingly, the light-shielding gate 30 (31) moves to either the open position or the closed position. When the light-shielding gate 30 is open, the conveyance line 3 can carry the mold M into the operation space S through the carrying-in port 22. When the light-shielding gate 31 is open, the conveyance line 3 can carry the mold M out of the operation space S through the carrying-out port 23. When the light-shielding gate 30 is closed, the carrying-in port 22 is blocked with the light-shielding gate 30. When the light-shielding gate 31 is closed, the carrying-out port 23 is blocked with the light-shielding gate 31. That is, when the light-shielding gate 30 (31) is closed, the light-shielding gate 30 (31) suppresses leakage of the laser light L of the head 10 from the operation space S.

The control unit 40 controls the head 10 and the light-shielding gate 30 (31). The controlling means determining position and operation. The control unit 40 is configured as, for example, a PLC. The control unit 40 may be configured as the computer system described above. The control unit 40 may be disposed outside the light-shielding case 20 or may be disposed inside the light-shielding case 20. The control unit 40 includes a gate controller 41 and a head controller 42.

The head controller 42 mainly controls the position of the head 10, and output, the irradiation position, and the focal position of the laser light L. The head controller 42 controls the position of the head 10 in the operation space S by operating the three-axis driving mechanism 11. The head controller 42 controls the output, the irradiation position, and the focal position of the laser light L by controlling the laser light source, the galvanometer mirror, and the focusing lens. The head 10 marks the identifier on the mold M in accordance with the control of the head controller 42.

The gate controller 41 controls the opening/closing of the light-shielding gate 30 (31). The gate controller 41 changes the position of the light-shielding gate 30 (31) by operating the driving unit 32 (33). A mode of the opening/closing of the light-shielding gate 30 (31) is not limited to an up-down direction, and may be a right-left direction or a rotation direction.

The control unit 40 can be configured to be communicable with the line controller 6 which controls the operation of the conveyance line 3. The line controller 6 controls the position of the mold M on the conveyance line 3. The line controller 6 may notify the control unit 40 that the mold M has been carried into the operation space S. Specifically, the line controller 6 transmits, to the control unit 40, a carrying-in completion signal notifying that the carrying-in of the mold M into the operation space S has been completed. When receiving the carrying-in completion signal, the gate controller 41 of the control unit 40 closes the light-shielding gate 30 (31). After the light-shielding gate 30 (31) is closed, the head controller 42 of the control unit 40 starts marking of the identifier on the mold M by operating the head 10.

The head controller 42 may notify that the application of the laser light L by the head 10 has been completed. For example, the head controller 42 transmits, to the gate controller 41, a marking completion signal notifying that the marking of the identifier on the mold M by the head 10 has been finished. When receiving the marking completion signal, the gate controller 41 opens the light-shielding gate 30 (31).

Operation of Laser Marking System

Figure 3:
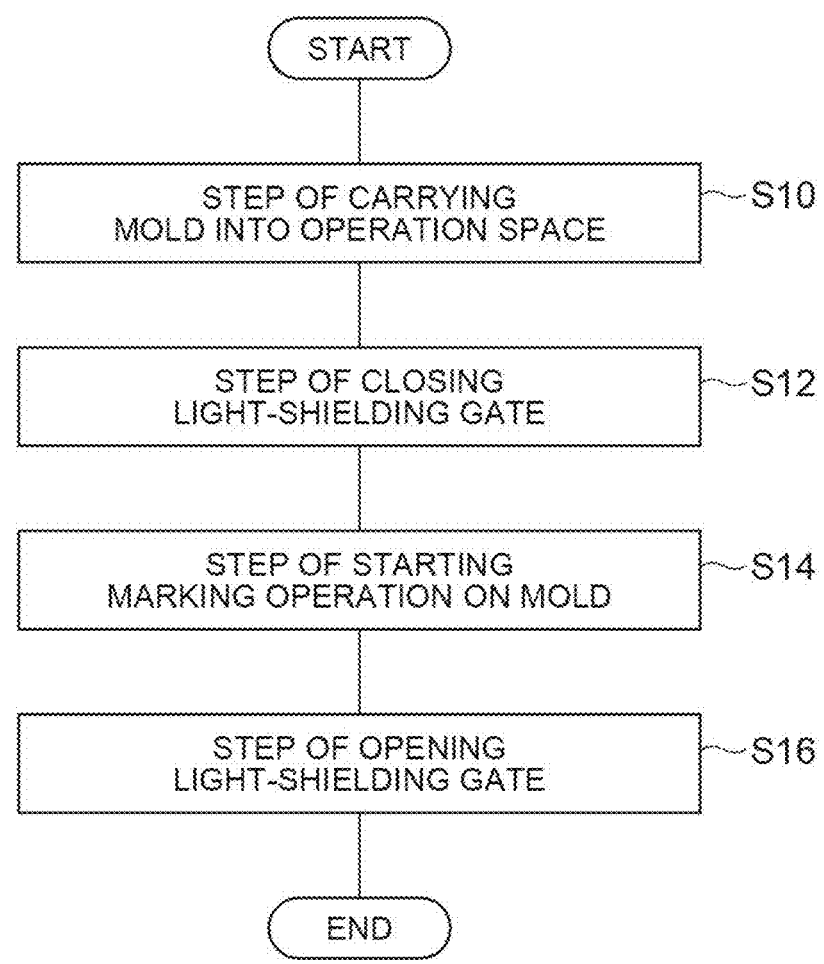
FIG. 3 is a flowchart illustrating an operation of the laser marking apparatus.

FIG. 3 is a flowchart illustrating an operation of the laser marking system. The flowchart of FIG. 3 is started, for example, in accordance with a start instruction from the operator. At the start of the system, the gate controller 41 opens the light-shielding gate 30 (31) by operating the driving unit 32 (33). When the flowchart of FIG. 3 is started, the line controller 6 carries the mold M into the operation space S by operating the conveyance line 3 (step S10). The line controller 6 may carry the mold M into the operation space S in accordance with opening/closing information of the light-shielding gate 30 based on the gate controller 41.

Next, the gate controller 41 closes the light-shielding gate 30 (31) in response to the carrying-in of the mold M (step S12). For example, when the mold M is located at a predetermined position inside the operation space S, the line controller 6 transmits, to the gate controller 41, a carrying-in completion signal indicating that the carrying-in of the mold M has been completed. The line controller 6 may detect that the mold M is located at the predetermined position by using, for example, a sensor or on the basis of a predetermined number of conveyed flasks. The mold M may be positioned at the predetermined position by coming into contact with a positioning member (not illustrated). After receiving the carrying-in completion signal from the line controller 6, the gate controller 41 closes the light-shielding gate 30 (31) by operating the driving unit 32 (33). The gate controller 41 opens or closes the light-shielding gate 30 (31) in accordance with the carrying-in completion signal, which enables the laser marking system 7 to reliably avoid interference between the mold M on the conveyance line 3 and the light-shielding gate 30 (31).

Next, the head controller 42 starts a marking operation on the mold M in response to the closing of the light-shielding gate 30 (31) (step S14). For example, the gate controller 41 outputs, to the head controller 42, a gate closing signal indicating that the light-shielding gate 30 (31) has been closed. When receiving the gate closing signal, the head controller 42 causes the head 10 to start the marking operation on the mold M.

At last, the gate controller 41 opens the light-shielding gate 30 (31) in response to the marking operation ending (step S16). For example, the head controller 42 outputs, to the gate controller 41, a marking completion signal indicating that the head 10 has finished the marking operation on the mold M. When receiving the marking completion signal, the gate controller 41 opens the light-shielding gate 30 (31) by operating the driving unit 32 (33). The line controller 6 carries the mold M out of the laser marking apparatus 4 by operating the conveyance line 3. In this manner, the flowchart of FIG. 3 is finished.

Figure 4:
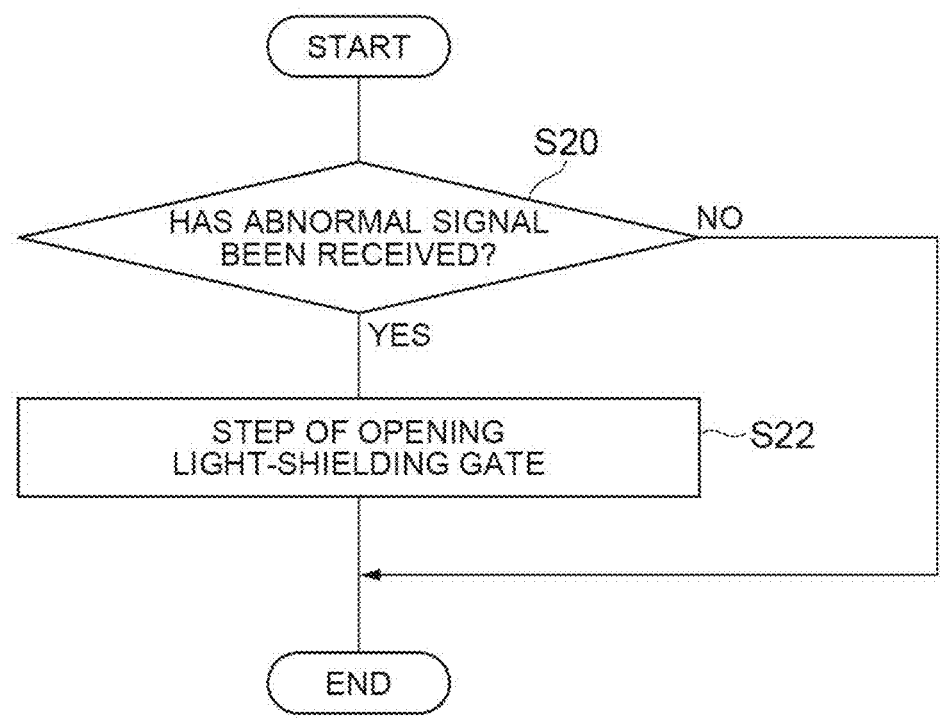
FIG. 4 is a flowchart illustrating an operation of the laser marking apparatus receiving an abnormal signal.

FIG. 4 is a flowchart illustrating an operation of the laser marking apparatus receiving an abnormal signal. The flowchart of FIG. 4 is started, for example, at the start of the system. The flowchart of FIG. 4 is executed in tandem with the flowchart of FIG. 3, and the operation of the flowchart of FIG. 4 takes precedence over the operation of the flowchart of FIG. 3.

The gate controller 41 determines whether an abnormal signal has been received (step S20). When the head 10 does not normally operate, the head controller 42 outputs an abnormal signal to the gate controller 41. The head controller 42 transmits the abnormal signal to the gate controller 41, for example, when the position of the head 10, and the output, the irradiation position, and the focal position of the laser light L cannot be controlled, or when the marking completion signal cannot be transmitted. When the abnormal signal has not been received (step S20: NO), the flowchart of FIG. 4 is finished. On the other hand, when the abnormal signal has been received (step S20: YES), the gate controller 41 opens the light-shielding gate 30 (31) (step S22). Alternatively, the gate controller 41 determines that the light-shielding gate 30 (31) is open and finishes step S22. When the light-shielding gate 30 (31) is opened in accordance with the flowchart of FIG. 4 (including the case where the light-shielding gate 30 (31) is determined to be open), the operation of the flowchart of FIG. 3 is disabled at any timing thereafter. That is, the light-shielding gate 30 (31) is always kept open. In this manner, the flowchart of FIG. 4 is finished.

Figure 5:
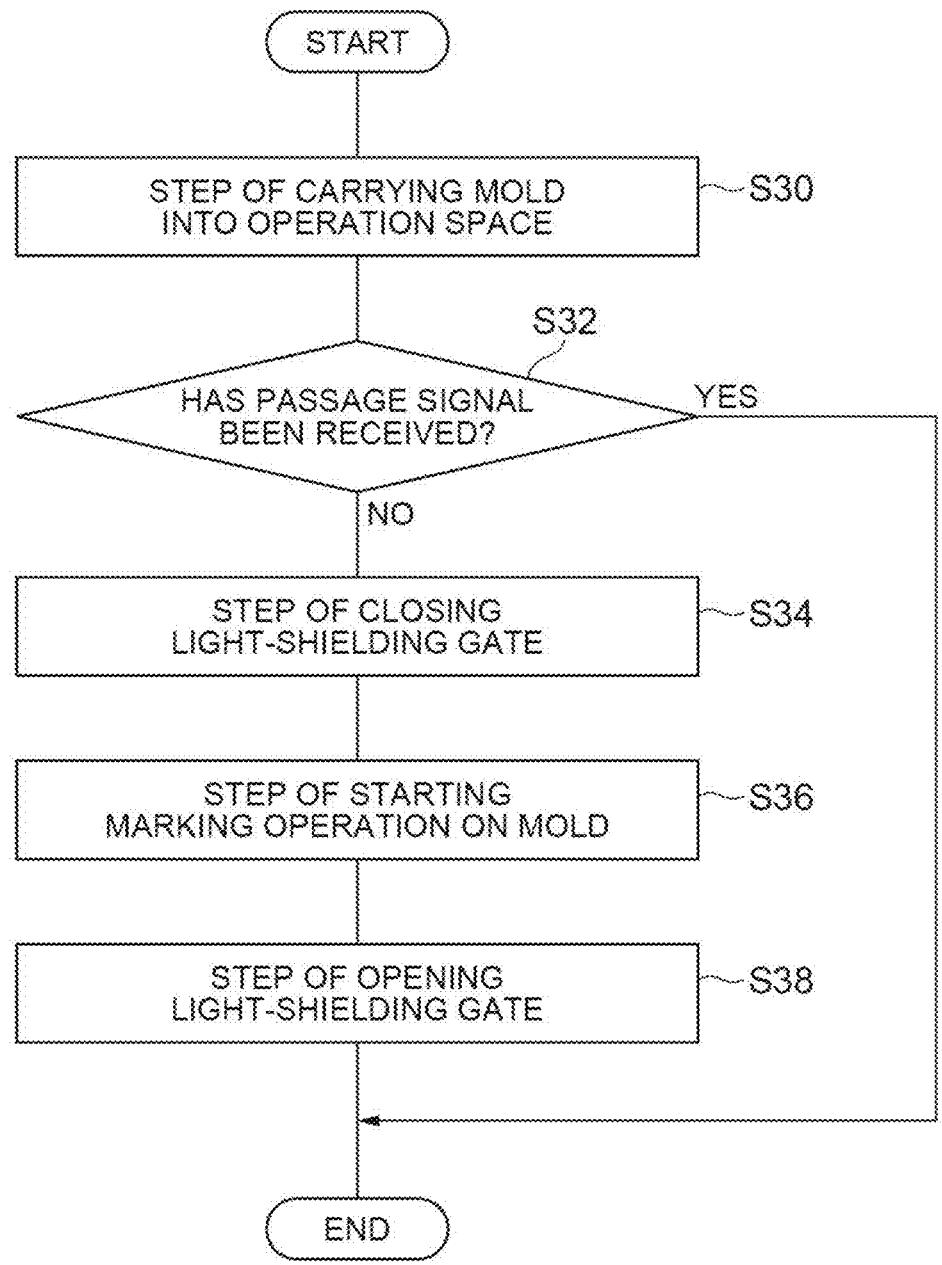
FIG. 5 is a flowchart illustrating an operation of the laser marking apparatus receiving a passage signal.

FIG. 5 is a flowchart illustrating an operation of the laser marking apparatus 4 receiving a passage signal. The flowchart of FIG. 5 is started, for example, in accordance with a start instruction from the operator. At the start of the system, the gate controller 41 opens the light-shielding gate 30 (31) by operating the driving unit 32 (33). When the flowchart of FIG. 5 is started, the line controller 6 carries the mold M into the operation space S by operating the conveyance line 3 (step S30).

Next, the control unit 40 determines whether a passage signal has been received (step S32). When receiving a signal indicating carrying-in of a mold M that does not need to be marked with the identifier, the line controller 6 transmits the passage signal to the control unit 40. The mold M that does not need to be marked with the identifier includes, for example, a drag (or a cope) that needs to be marked with the identifier only on the cope (or the drag) or a mold M with molding failure. The signal indicating the carrying-in of the mold M that does not need to be marked with the identifier may be transmitted by the operator through an input device. A sensor (not illustrated) provided on the conveyance line 3 may determine whether the identifier is not required and transmit the signal indicating the carrying-in of the mold M that does not need to be marked with the identifier.

When the passage signal has not been received (step S32: NO), the laser marking apparatus 4 executes steps S34 to S38 which are the same as steps S12 to S16 described above, and the flowchart of FIG. 5 is finished. On the other hand, when the passage signal has been received (step S32: YES), the flowchart of FIG. 5 is finished. That is, the head controller 42 does not execute the marking operation, and the gate controller 41 maintains the open state of the light-shielding gate 30 (31). In this manner, the flowchart of FIG. 5 is finished.

Other Configuration Examples of Laser Marking Apparatus

Figure 6:
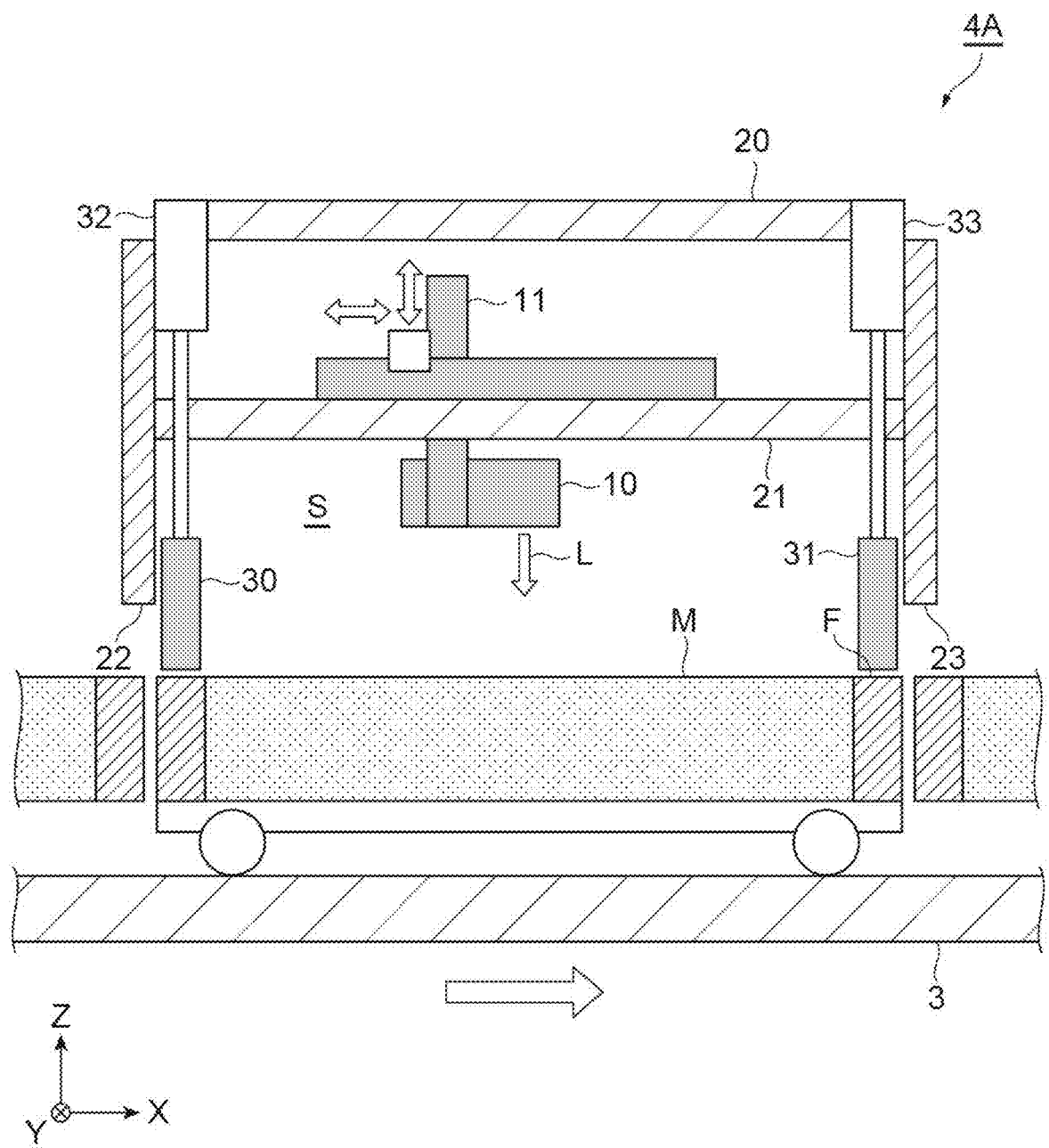
FIG. 6 is a sectional view illustrating an example of another configuration of the laser marking apparatus.

FIG. 6 is a sectional view illustrating an example of another configuration of the laser marking apparatus 4. In FIG. 6, the control unit 40 is omitted. As illustrated in FIG. 6, in a laser marking apparatus 4A, the light-shielding gate 30 (31) is disposed inside the operation space S. The other configurations of the laser marking apparatus 4A are the same as those of the laser marking apparatus 4 illustrated in FIG. 2. In this case, the light-shielding gate 30 and the light-shielding gate 31 may be connected together. In the case where the light-shielding gate 30 and the light-shielding gate 31 are connected and integrally configured, the light-shielding gate 30 and the light-shielding gate 31 are configured as a frame member and integrally perform opening and closing operations.

Figure 7:
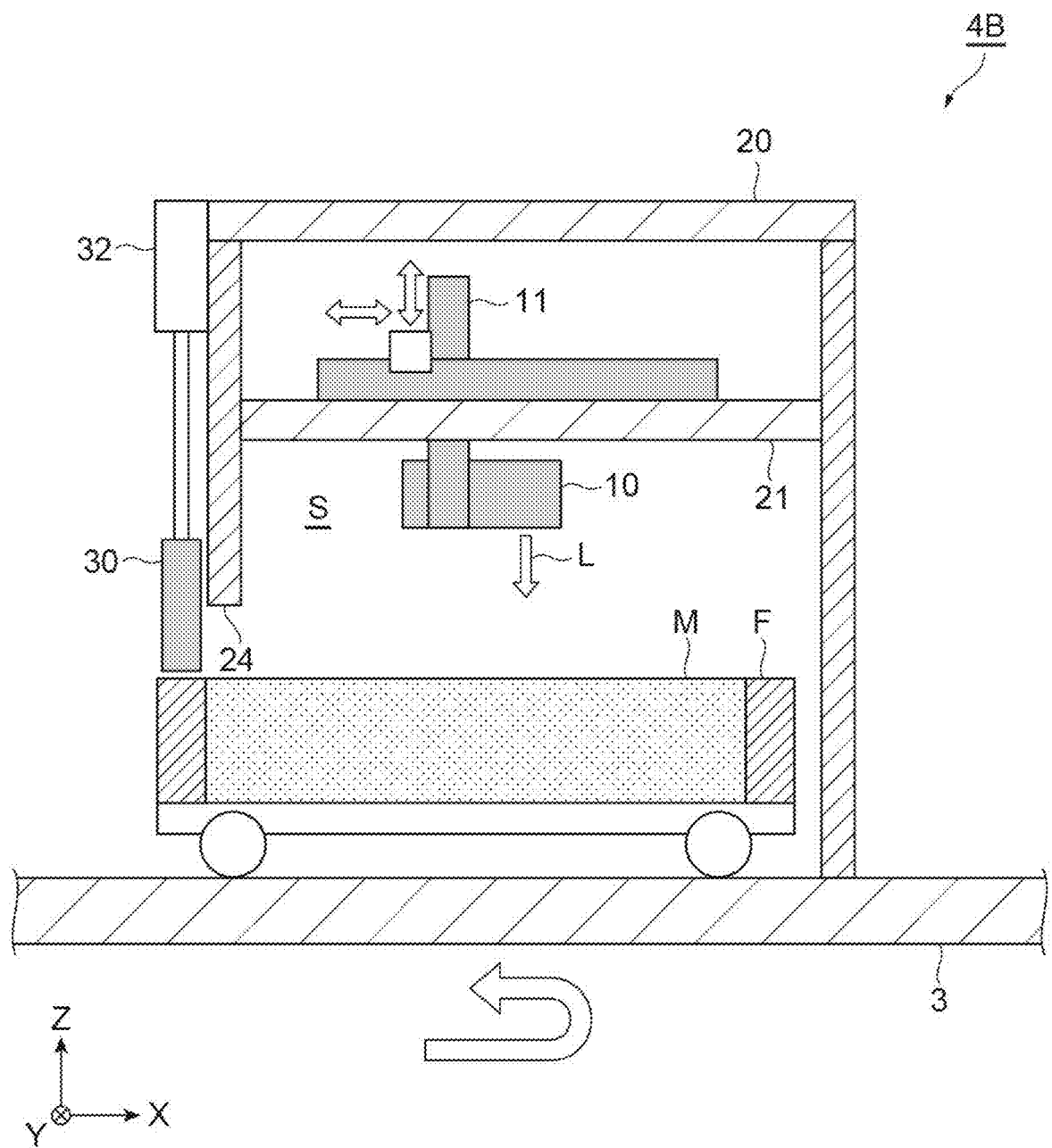
FIG. 7 is a sectional view illustrating an example of the configuration of a laser marking apparatus including one opening provided on a light-shielding case.

FIG. 7 is a sectional view illustrating an example of the configuration of a laser marking apparatus 4B including one opening 24 provided on the light-shielding case 20. In FIG. 7, the control unit 40 is omitted. As illustrated in FIG. 7, the laser marking apparatus 4B includes one opening 24 corresponding to the carrying-in port 22 and the carrying-out port 23, and a light-shielding gate 30 is provided at the opening 24. The other configurations of the laser marking apparatus 4B are the same as those of the laser marking apparatus 4 illustrated in FIG. 2. The opening 24 communicates with the operation space S inside the light-shielding case 20. In this case, the laser marking apparatus 4B includes carrying-in and carrying-out means (not illustrated, e.g., a traverser) which carries the mold M into the operation space S and caries the mold M out of the operation space S. The mold M is carried into the operation space S inside the light-shielding case 20 through the opening 24. Furthermore, the mold M is carried out to the outside from the operation space S through the opening 24.

Figure 8:
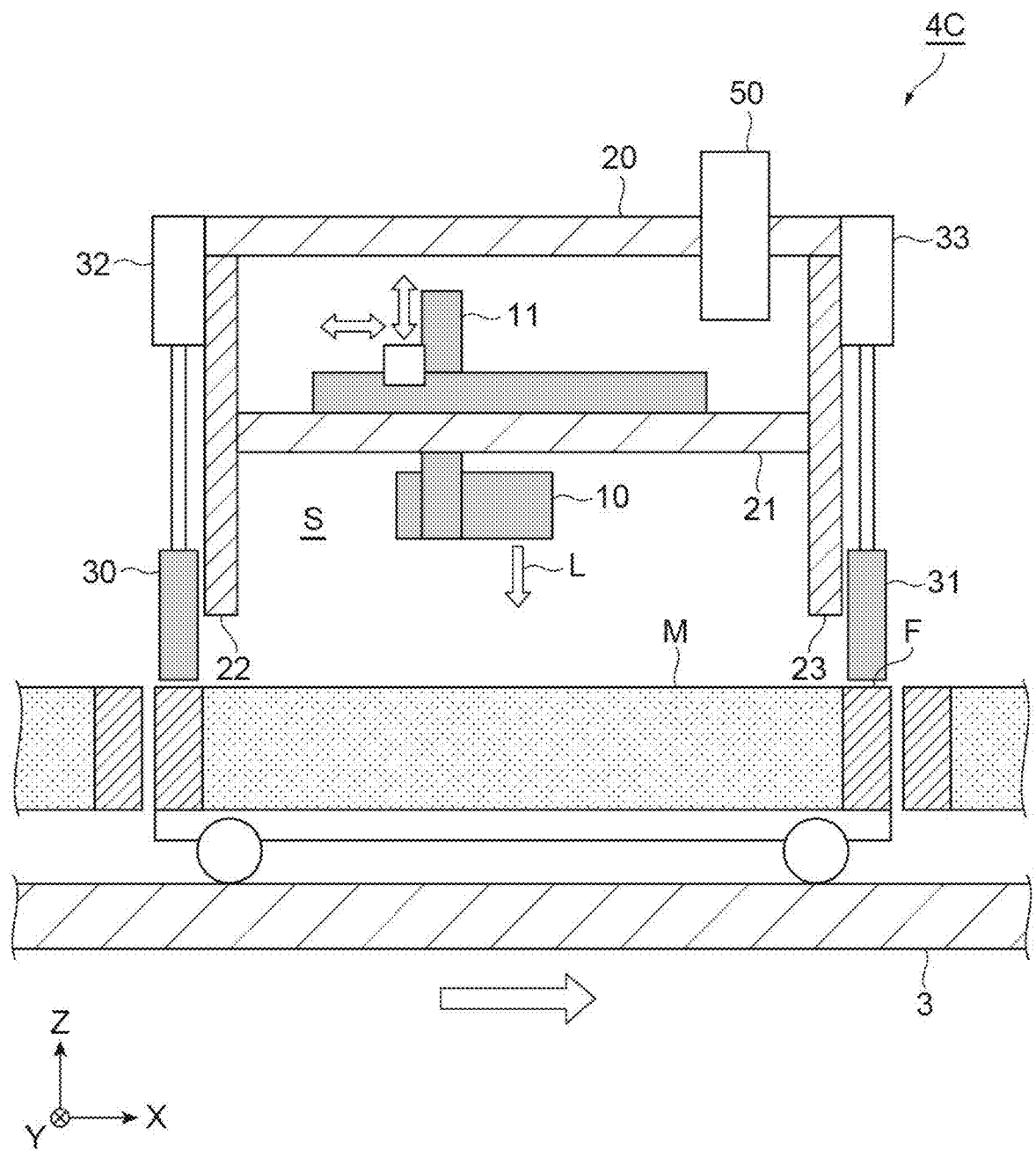
FIG. 8 is a sectional view illustrating an example of the configuration of a laser marking apparatus including a dust collector provided on a light-shielding case.

FIG. 8 is a sectional view illustrating an example of the configuration of a laser marking apparatus 4C including a dust collector 50 provided on the light-shielding case 20. In FIG. 8, the control unit 40 is omitted. As illustrated in FIG. 8, the laser marking apparatus 4C further includes the dust collector 50 which is provided on the light-shielding case 20. The other configurations of the laser marking apparatus 4C are the same as those of the laser marking apparatus 4 illustrated in FIG. 2. The dust collector 50 sucks inside air in the operation space S, takes thereinto smoke or vapor which is generated from the mold M in marking of the identifier, and collects dust or the like, thereby purifying the inside air in the operation space S. The laser marking apparatus 4C may include an auxiliary device (not illustrated) which generates an air current toward the dust collector 50. In this case, since the air current is generated from the auxiliary device toward the dust collector 50, the dust collector 50 can efficiently take thereinto smoke or vapor to purify the inside air in the operation space S.

Figure 9:
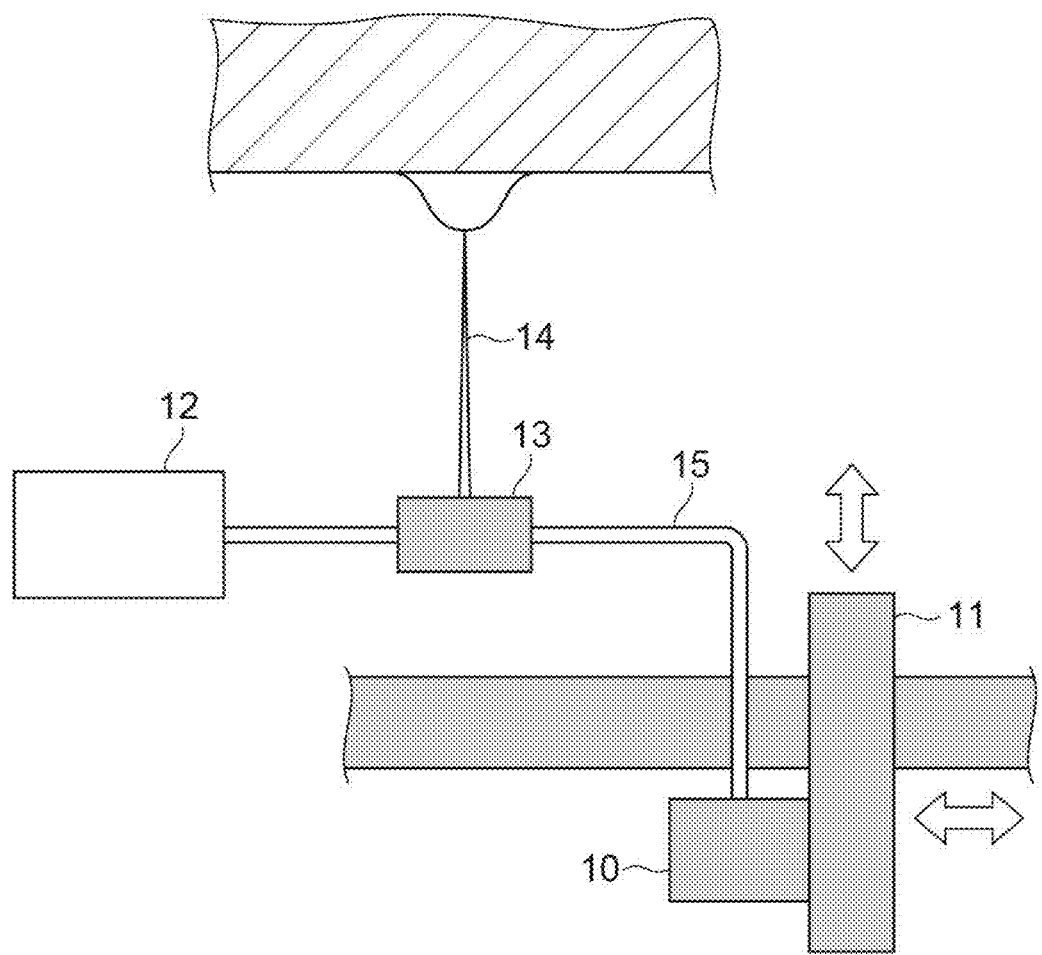
FIG. 9 is a schematic diagram illustrating an example of the configurations of a cover member covering a cable and a support member.

The laser marking apparatus 4 may further include a light source 12 which generates laser light, a cable 15 which transmits the laser light from the light source 12 to the head 10, a cover member 13 which covers the cable 15, and a support member 14 which supports the cable 15 and the cover member 13. FIG. 9 is a schematic diagram illustrating an example of the configurations of the cover member 13 which covers the cable 15 and the support member 14. The cable 15 connects the light source 12 and the head 10 and transmits the laser light L generated in the light source 12 to the head 10. Since the head 10 is moved by the three-axis driving mechanism 11, bending stress is generated on the cable 15 connected to the head 10. The bending stress is also generated due to warpage of the cable 15 caused by its own weight. When large bending stress is repeatedly generated, the cable 15 is broken due to fatigue.

The cover member 13 is, for example, an elastic member formed of a hard rubber material. The cover member 13 bends by receiving the bending stress integrally with the cable 15. In this case, the bending radius of the cable 15 is larger in a part covered with the cover member than in a part not covered with the cover member. In the case where the bending radius is large, the bending stress generated on the cable 15 is reduced as compared to the case where the bending radius is small. The support member 14 supports the cable 15 and the cover member 13. The supporting means supporting the own weight of an object to be supported, and the object to be supported may be supported from below or may be hung from above. For example, one end of the support member 14 supports the cover member 13 and the cable 15 in a hanging manner, and the other end of the support member 14 is fixed to a member located above. The member located above is, for example, a member whose position is relatively stable, such as a housing of the light-shielding case 20. The warpage of the cable 15 caused by the own weight of the cable 15 and the weight of the cover member 13 is reduced by the support member 14. Thus, the bending stress generated on the cable 15 is reduced by the cover member 13 and the support member 14.

Summary of Embodiment

According to the laser marking apparatus 4, the laser marking system 7, and the laser marking method, the mold M is carried into the carrying-in port 22 of the light-shielding case 20 through the conveyance line 3. When the mold M is carried into the operation space S inside the light-shielding case 20, the light-shielding gate 30 (31) provided at the carrying-in port 22 (carrying-out port 23) is closed, and the marking operation on the mold M is started. When the marking operation is finished, the light-shielding gate 30 (31) is opened. In this manner, the light-shielding gate 30 (31) is opened when the mold M is conveyed, and the light-shielding gate 30 (31) is closed when the laser light L is applied to the mold M. This enables the laser marking apparatus 4, the laser marking system 7, and the laser marking method to suppress leakage of the laser light L from the operation space S to the outside when the identifier is marked on the mold M on the conveyance line 3 by using the laser light L. The laser marking apparatus 4, the laser marking system 7, and the laser marking method can reliably block the laser light L without interference with the molds M on the conveyance line 3, the molds M being continuously carried in and out or repeatedly intermittently carried in and out.

In the laser marking apparatus 4, the light-shielding gate 30 (31) is provided at each of the carrying-in port 22 and the carrying-out port 23. Thus, the laser marking apparatus 4 can more reliably suppress leakage of the laser light L than a case where the light-shielding gate is provided only at either the carrying-in port 22 or the carrying-out port 23. The laser marking apparatus 4 can avoid interference between the mold M on the conveyance line 3 and the light-shielding gate 30 (31). The laser marking apparatus 4 can avoid the influence of a fault of the head 10 on the conveyance of the mold M. The laser marking apparatus 4 can omit the marking operation on the mold M that does not need to be marked and can thus prevent shortening of the life of the light source 12 which generates the laser light L and the life of the head 10. The laser marking apparatus 4C can suppress attenuation of the laser light L caused by, for example, smoke generated in the marking operation and suppress reduction in the accuracy of marking. Since the bending stress generated on the cable 15 is reduced by the cover member 13 and the support member 14, the laser marking apparatus 4 can reduce deterioration of the cable 15 as compared to a case where the cover member 13 and the support member 14 are not provided.

Modifications

Although various explanatory embodiments have been described above, the present disclosure is not limited to the above explanatory embodiments, and various omissions, replacements, and modifications may be made.

The light-shielding gate may be provided only at either the carrying-in port 22 or the carrying-out port 23. For example, in a case where the operator is not exposed to the laser light L leaking through the carrying-out port 23, the light-shielding gate is provided only at the carrying-in port 22. Similarly, in a case where the operator is not exposed to the laser light L leaking through the carrying-in port 22, the light-shielding gate is provided only at the carrying-out port 23.

Figure 10:
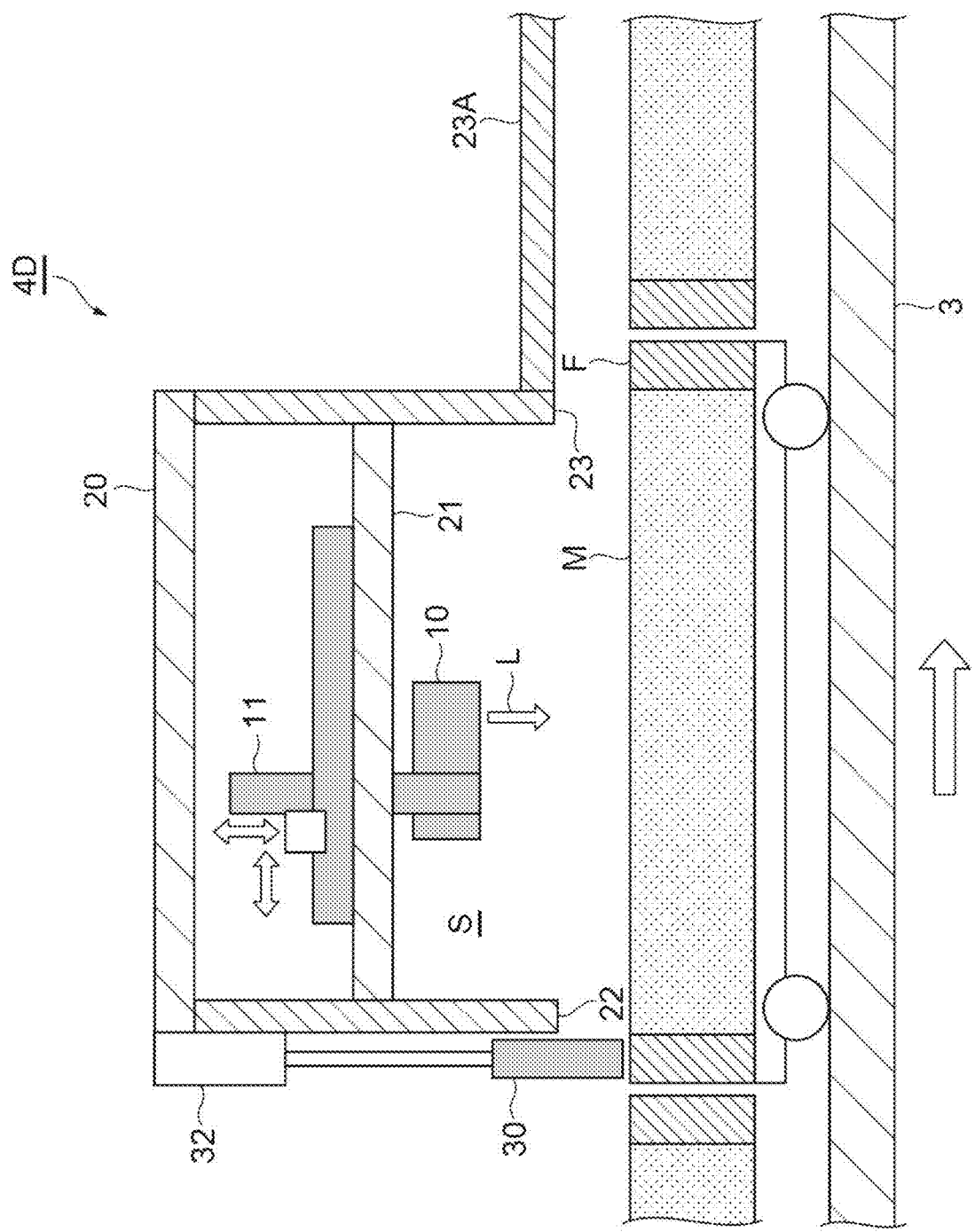
FIG. 10 is a sectional view illustrating an example of the configuration of a laser marking apparatus including a light-shielding gate provided only at a carrying-in port.

FIG. 10 is a sectional view illustrating an example of the configuration of a laser marking apparatus 4D including the light-shielding gate 30 provided only at the carrying-in port 22. In the laser marking apparatus 4D, a shielding member 23A is provided at the carrying-out port 23. The shielding member 23A defines, inside thereof, a space through which the mold M that has carried out through the carrying-out port 23 can pass. In this case, the laser light L repeats reflection and attenuation inside the shielding member 23A, and the operator is thus not exposed to the laser light L leaking through the carrying-out port 23. Thus, the light-shielding gate 30 is provided only at the carrying-in port 22. The other configurations of the laser marking apparatus 4D are the same as those of the laser marking apparatus 4 illustrated in FIG. 2. Similarly, in a case where the shielding member is provided at the carrying-in port 22, the light-shielding gate 30 is provided only at the carrying-out port 23.

The laser marking apparatus 4 is not limited to the mode that marks the identifier on the mold formed of sand. The laser marking apparatus 4 can also mark the identifier on a self-hardening mold, a thermosetting mold, or a gas-hardening mold. The laser marking apparatus 4 can mark the identifier not only on the mold, but also on the core. The mold described in the present disclosure includes the mold described above, the self-hardening mold, the thermosetting mold, the gas-hardening mold, and the core.

Although the embodiment of the present disclosure describes the example using, as the molding machine 2, a flask type molding machine that alternately molds a cope and a drag in cope and drag flasks, the present disclosure is not limited thereto. Alternatively, for example, the present disclosure may be applied to a flaskless molding machine in which a cope and a drag are simultaneously molded, then joined together, then taken out of cope and drag flasks, and then carried out of the molding machine 2 without the flasks.

REFERENCE SIGNS LIST

3 . . . conveyance line, 4 . . . laser marking apparatus, 7 . . . laser marking system, 10 . . . head, 20 . . . light-shielding case, S . . . operation space, 22 . . . carrying-in port, 23 . . . carrying-out port, 30, 31 . . . light-shielding gate, 40 . . . control unit, M . . . mold.

What is claimed is:

1. A laser marking apparatus provided on a conveyance line conveying a mold, the laser marking apparatus marking an identifier on the mold on the conveyance line and comprising:
   a head configured to mark the identifier on the mold by applying laser light to the mold;
   a light-shielding case defining, inside the light-shielding case, an operation space housing the head, the light-shielding case including a carrying-in port communicating with the operation space and a carrying-out port communicating with the operation space, the light-shielding case being provided on the conveyance line in such a manner that the mold is carried into and carried out of the operation space through the carrying-in port and the carrying-out port, and formed of a material that has a light-shielding property against the laser light irradiated by the head;
   a light-shielding gate provided at the carrying-in port and openable and closable, and formed of a material that has the light-shielding property against the laser light irradiated by the head;
   an additional light-shielding gate provided at the carrying-out port, and formed of a material that has the light-shielding property against the laser light irradiated by the head; and
   a control unit configured to control operation of the head, the light-shielding gate, and the additional light-shielding gate, wherein
   the control unit closes the light-shielding gate and the additional light-shielding gate and causes the head to start a marking operation on the mold in response to carrying-in of the mold into the operation space and opens the light-shielding gate and the additional light-shielding gate in response to the marking operation ending,
   the control unit includes a head controller and a gate controller,
   the head controller transmits an abnormal signal to the gate controller when the head controller cannot control at least one of a position of the head, an output of the laser light, and irradiation position of the laser light, and the focal position of the laser light, or when the head controller cannot transmit a marking completion signal, and
   the gate controller opens the light-shielding gate and the additional light-shielding gate when receiving the abnormal signal.

2. The laser marking apparatus according to claim 1, further comprising:
   a connection to a line controller, wherein
   the control unit is configured to be communicable with the line controller, via the connection to the line controller,
   the line controller controlling operation of the conveyance line and transmitting a carrying-in completion signal to the control unit, via the connection to the line controller, when the mold has been carried into the operation space, and
   the control unit closes the light-shielding gate and the additional light-shielding gate after receiving the carrying-in completion signal from the line controller.

3. The laser marking apparatus according to claim 1, wherein
   the control unit includes a head controller and a gate controller,
   the head controller transmits a marking completion signal to the gate controller when the marking operation is completed, and
   the gate controller opens the light-shielding gate and the additional light-shielding gate after receiving the marking completion signal.

4. The laser marking apparatus according to claim 1, wherein
   the control unit includes a head controller and a gate controller,
   the control unit is configured to be communicable with a line controller controlling operation of the conveyance line and transmitting a passage signal to the control unit when receiving a signal indicating carrying-in of a mold that does not need to be marked with the identifier,
   the head controller does not cause the head to start a marking operation when receiving the passage signal, and
   the gate controller opens the light-shielding gate and the additional light-shielding gate when receiving the passage signal.

5. The laser marking apparatus according to claim 1, further comprising a dust collector provided on the light-shielding case.

6. The laser marking apparatus according to claim 1, further comprising:
   a light source configured to generate laser light;
   a cable transmitting laser light from the light source to the head;
   a cover covering the cable; and
   a support supporting the cable and the cover.

7. A laser marking method for marking an identifier on a mold on a conveyance line conveying the mold using the laser marking apparatus according to claim 1, the method comprising:
   carrying the mold into the operation space in the light-shielding case;
   closing a light-shielding gate and the additional light-shielding gate in response to carrying-in of the mold into the operation space;
   starting a marking operation on the mold in response to closing of the light-shielding gate and the additional light-shielding gate; and
   opening the light-shielding gate and the additional light-shielding gate in response to the marking operation ending.

8. A laser marking system comprising:
   a conveyance line configured to convey a mold;
   a head configured to mark an identifier on the mold on the conveyance line by applying laser light to the mold;
   a light-shielding case defining, inside the light-shielding case, an operation space housing the head, the light-shielding case including a carrying-in port communicating with the operation space and a carrying-out port communicating with the operation space, the light-shielding case being provided on the conveyance line in such a manner that the mold is carried into and carried out of the operation space through the carrying-in port and the carrying-out port, and formed of a material that has a light-shielding property against the laser light irradiated by the head;
   a light-shielding gate provided at the carrying-in port and openable and closable, and formed of a material that has the light-shielding property against the laser light irradiated by the head;

an additional light-shielding gate provided at the carrying-out port, and formed of a material that has the light-shielding property against the laser light irradiated by the head; and a control unit controlling operation of the head, the light-shielding gate, and the additional light-shielding gate, wherein the control unit closes the light-shielding gate and the additional light-shielding gate and causes the head to start a marking operation on the mold in response to carrying-in of the mold into the operation space and opens the light-shielding gate and the additional light-shielding gate in response to the marking operation ending, the control unit includes a head controller and a gate controller, the head controller transmits an abnormal signal to the gate controller when the head controller cannot control at least one of a position of the head, an output of the laser light, an irradiation position of the laser light, and the focal position of the laser light, or when the head controller cannot transmit a marking completion signal, and the gate controller opens the light-shielding gate and the additional light-shielding gate when receiving the abnormal signal.

* * * * *